Feb. 28, 1933.   J. A. H. BARKEIJ   1,899,130
INTERNAL COMBUSTION ENGINE
Original Filed Oct. 6, 1926
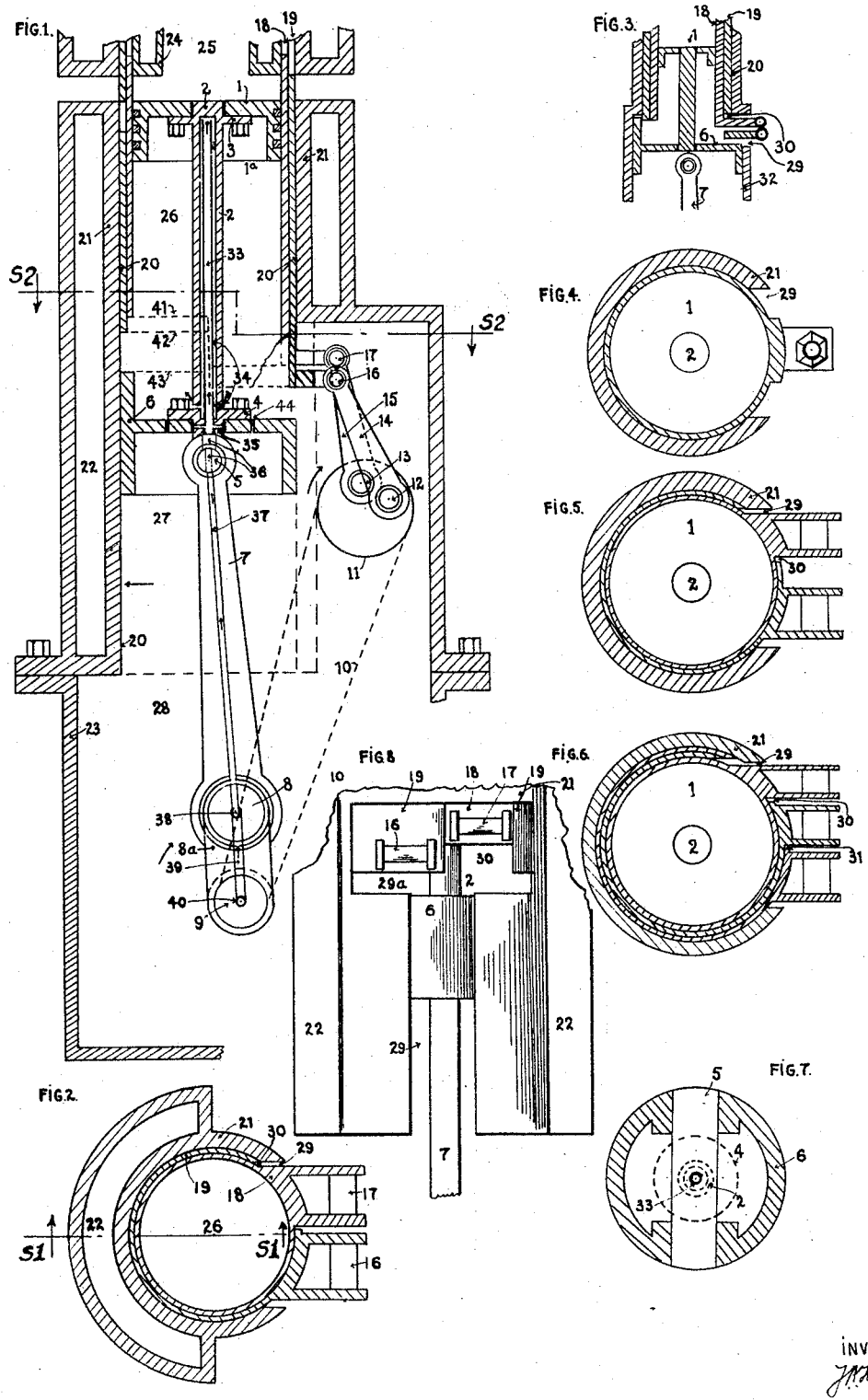
INVENTOR
J.A.H.Barkeij Patented Feb. 28, 1933

1,899,130

UNITED STATES PATENT OFFICE

JEAN A. H. BARKEIJ, OF ALTADENA, CALIFORNIA

INTERNAL COMBUSTION ENGINE

Application filed October 6, 1926, Serial No. 139,829. Renewed July 27, 1932.

My invention relates to improvements in piston cooling and sleeve valve construction together with piston construction.

My primary object is to eliminate the side thrust of the piston on the sleeve.

My secondary object is to decrease the length and weight of the sleeves.

My third object is to provide the lower end of the cylinder wall and the sleeves with recesses in order to decrease the length of the piston and the height of the engine.

My fourth object is to cool the piston with oil delivered from the crankshaft.

My fifth object is to combine these objects in the same engine, a sleeve valve engine with one, two or three sleeves, situated between the piston and cylinderwall.

I accomplish these and other objects hereinafter appearing by the means disclosed in the drawing and the specification.

Fig. 1 is a broken side elevation of a cylinderwall, two sleeves, a piston and crosshead with oil leads. Fig. 1 is Fig. 2 on the section line S1.

Fig. 2 is a top view of Fig. 1 with horizontal sections of the cylinderwall and sleeves at different heights. Fig. 2 is Fig. 1 on the section line S2.

Fig. 3 is a broken side elevation like Fig. 1 with a modified arrangement of the sleeves, the piston and crosshead.

Figs. 4, 5, 6 are top views of horizontal sections of the recesses in the cylinderwall and the respective single, two or three concentric sleeves.

Fig. 7 shows a top view of the relative position of the wristpin in the crosshead, and the position of the oil leads.

Fig. 8 is a side view of the lower part of the cylinder, pistons and sleeves.

1 is the upper piston reciprocating without thrust on the wall of the cylinder 21. 2 is a hollow rod of less diameter than the upper piston and is provided with flanges 3 and 4 at its upper and lower end in order to be attached to the upper compression-piston 1 and lower crosshead 6. This thrust piston has the function of a (slipper) crosshead, but it has been given the shape of a circular piston as the inertia forces in high speed explosion engines cause considerable forces on both sides of this crosshead when the piston reverses its direction of travel. The construction shows further, that the connecting rod 2 does not slide in a bearing as is usually the case in engines with a piston and crosshead. The absence of this bearing increases the thrust on that side of piston 6 which receives the thrust when the piston is ascending. If this piston 6 was made in the form of a pure slipper crosshead, this thrust would have been transferred to the sleeves and that is exactly what we are trying to avoid.

It is understood, that the connection between the two pistons should be made as flexible in a horizontal plane as the rigidity in a vertical plane between the two pistons will permit, to avoid that any thrust will be transferred to the upper piston and further to the sleeve.

The construction preferred shows the thrust surface below the sleeve and is an extension of the cylinderwall upon which the outer surface of the outer sleeve slides. This construction increases the height of the engine appreciably, but if the connecting rod is made short this increase will not be so excessive. The thrust on the extension of the cylinderwall will be of course excessive in that case, and for this reason it is watercooled and the surface on the pressure side of the crosshead is considerably increased. The total reciprocating mass of the piston and crosshead and a short connecting rod does not need to exceed the standard trunkpiston-weight excessively, when constructed with care in view of the forces developed and exerted on the different parts in this construction. The wear on the other hand of the piston and inside of the sleeve will be a minimum and the sliding surface of the crosshead can be made adjustable as is common practice on large engines. The absence of the friction-heat will decrease the temperature of the inner sleeve considerably and the thickness of the sleeves can be decreased so that the inertia forces will be so small that they will not be noticed, which is not the case in the standard construction with a trunk-piston. The driving mechanism of the sleeve will not be subjected to great forces, which is of particular advantage when the sleeve has a complicated movement, as for instance in the Burt engine, in which said sleeve has an elliptic movement. The original construction of the type had a wrist pin connected on the sleeve as shown in Fig. 4. The latter can be made solid with the hollow rod and with the upper piston 1. 5 is the wristpin attached to the crosshead, 7 is the connecting rod, 8 the crankpin, 9 the crankshaft. 10 is a chain to drive the eccentric shaft 11 at half engine speed in this particular case. 12, 13, are crankpins connected with the wristpins 16 and 17 of the sleeves 19 and 18 by connecting rods 14 and 15. 25 is the space in the detachable head, encompassed by the inner sleeve 18. 20 is the inside diameter of the cylinderwall and waterspace 21. 22 is the waterspace on the side of the cylinderblock where the thrust of the crosshead 6 works. 23 is the crankcase, 24 the detachable head, 25 the space therein, 26 is the space in which the piston 1 reciprocates, 27 that in which the crosshead 6 reciprocates, 28 the crank space. In Fig. 2 one sees that the left part of the crosshead extends at the upper end 43 only over about half the circumference, which parts slides into the left recess 41, 42 of the two sleeves, when reaching its upper position. This arrangement saves quite a lot of height in the engine, and therefore weight. These recesses 41, 42 in the sleeves can be extended even higher as shown, and the wrist pin 5 in the crosshead can be raised more than shown in the Figure 1. This construction eliminates all the friction of the sleeve valve type, and insuring at the same time exceptional long life for truck engines, which should induce manufacturers to adopt it.

In Figs. 2, 3, 4, 5, 6, 7, 8 the same numbers represent the same parts. In Figs. 2, 3, etc. 29 is the recess in the cylinderwall to receive the projection of the sleeves, to which the wristpins are attached. 30 is the recess in the outer sleeve to receive the projections of the inner sleeve, 31 is that in the middle sleeve.

The construction shown in Fig. 1 supposes that the engine runs in clockwise direction and the thrust of the connecting rod is on that part of the cylinder opposite the recess for the projections of the sleeves.

The axis of the shaft as shown is offset to the right, opposite to standard, classic-practice. The thrust during the working stroke of the piston is increased on the left side of the thrustsurface for the crosshead 6 and decreased from normal for the left side of this surface. If the piston 1 was double working the thrust of the crosshead due to the angularity of the connecting rod 7 attached to the crosshead 6 would reversely decrease for the right surface for the upstroke of piston and crosshead. As the thrustsurface of the crosshead can be more conveniently increased for the left part of the crosshead 6 on account of the driving mechanism 11—17, it is preferred to increase the thrust on the left part of the crosshead. The axis of the piston and crosshead may be or may not be aligned.

It can be seen from the proposed construction that the sleeves are entirely released from the side thrust of the piston and the resulting friction and heat. The sleeves can be made much shorter than in the standard construction and the whole timing mechanism can be made lighter. The recesses in the outer sleeve, if there is more than one sleeve, are made to decrease the distance between the piston and crosshead. The compression piston should not come lower than the highest position of the inner sleeve and the crosshead should not come higher than the lowest position of the outer sleeve or both sleeves. The sleeves can be shortened on the left side to allow the upwards extension of the thrust piston as indicated by the lines 41, 42, 43.

Fig. 8 is a variation. The recess in the cylinderwall is made only large enough to receive the projection for the wristpin of a single sleeve. This recess is broadened where these projections reciprocate or move. A single sleeve has usually a rotating, reciprocating movement. In case of two or three reciprocating sleeves the recesses of the outer and middle sleeves are aligned with the recess in the cylinderwall and the second and third sleeve are slid within the outer sleeve and are rotated in their proper place with respect to the eccentric shaft. The broader recess in the cylinderwall is 29a. The recess 29 can be made in front of the connection to allow an offset position of the crankshaft, but this is not necessary. The cooling area on the left side can be made less than or greater than a half circle. In the first case the base of the cylinder needs a support. The water space 22 can be entirely eliminated and oil cooling can be applied.

The cylinder block in Figs. 1 and 3 form a single piece of metal, by preference cast iron, and contain the bearings for the eccentric shaft 11, exactly beyond the uncooled lower portion of said cylinder at 22, shown in dotted lines at the right in Fig. 7. In engines, like 6 cylinder and 8 cylinder engines in line, this shaft and also the crankshaft are rather long, longer than is ordinary in line poppet-valve engines. These shafts are both subject to considerable torsion, which is transmitted to the crankcase of the engine with resulting vibrations. Therefore the lower part of the crankcase 23 is cast rather heavy, and preferable also made of the same metal with the upper half of the crankcase, preferably cast iron. This shaft may be removable from said crankcase in the direction of its axis, as shown in my Patent 1,595,372, filed April 9, 1923 No. 631,022, so that said lower part of the crankcase does not have to be split at the level of the axis of the crankshaft, as shown in Fig. 1.

If the upper half of the crankcase is cast in one piece with the cylinder block as shown, the foundation of the eccentric shaft is exceptionable rigid due to the rigidity of cast iron. The lower half 23 of the crankcase however has to be separate to attach the connecting rods to the crosshead, and the small connecting rods to the sleeves etc.

In Fig. 3 the crosshead has a diameter equal or greater than the outside diameter of the outer sleeve. This construction will shorten the length of the piston even more so than the construction of Fig. 1, but the increased diameter increases the cost of production. 32 is the greater diameter.

The cooling piston system is indicated by the numbers 33—40. The crankshaft 9, crankarm 8a, crankpin 8, connecting rod 7, wristpin 5 are provided with oil leads 40, 39, 38, 37, 36, connecting with each other continually or intermittently during the operation. The upper side of the connecting rod with aperture 36 is in constant connection with the aperture 35 in a member of the same number, pressed on said connecting rod by any suitable spring, not shown in drawing on account of its small dimensions. This member is preferably made sliding in an aperture in the piston to compensate for the eventual play in the wristpin. The aperture 35 is connected with the pipe 33 in the rod 2 forming an annular return passage, 34, for the cooling oil. The center of the piston, which is extremely hot in this type of engine on account of the inferior cooling of the piston, is cooled by the oil spouting from the oil tube 33 against this center. The wristpin is removed from said center and its heat, the lubrication of this part is greatly improved. The oil leaving the passage 34 can be made to pass through the holes 44 toward the crankcase.

I claim:

1. An internal combustion engine, comprising a cylinder, at least one concentric sleeve in said cylinder, a piston reciprocating in said sleeve, said piston reciprocating in said sleeve with a pressure head, a crosshead below said pressure head and forming one reciprocating part therewith, said crosshead reciprocating on said cylinder, said cylinder having the same bore throughout; said crosshead reciprocating below the lower edge of said concentric sleeve valve; a lug attached to said sleeve with a wristpin, a connecting rod attached to said wristpin, said connecting rod driven by an eccentric shaft, said shaft driven by a crankshaft, reciprocating said piston, pressure head and crosshead; said cylinder provided with a slot, extending from the lower edge of said cylinder to a point substantially below the ports in said cylinder, but extending above the space swept by said lug on said sleeve; said lug of said sleeve reciprocating in said slot in said cylinder, said slot located substantially in the plane of the path of the swinging connecting rod attached to said crosshead, said plane perpendicular to said crankshaft and eccentric shaft, so that said sleeve together with said piston, pressure head and crosshead may be removed from said cylinder, without rotating said sleeve or piston appreciably, and without removing the same parts from the adjacent cylinder.

2. The combination of claim 1 in which a second concentric sleeve envelops said first sleeve, said second sleeve also provided with a slot extending from its lower edge to a point substantially below the ports in said sleeve at the upper end thereof, said slot providing a pathway for the lug and connecting rod attached to said first sleeve; said slot in said second sleeve being substantially in the same vertical plane, perpendicular to said crankshaft and eccentric shaft as the slot in the cylinder, in order to remove both of said sleeves and said piston from said cylinder without rotating said lugs 90° in a plane parallel to the axes of said shaft; said construction resulting in a short engine, including several cylinders adjacent to each other, in a line.

3. In an internal combustion engine, an operating cylinder and a relatively stationary guide, a piston having a pressure head operating within at least one sleeve valve within said cylinder, a guide head spaced from the pressure head and operating within the guide, said sleeve valve operating above and beyond the guidehead of the piston, said guide head provided with a recess on that side where said sleeve is operated so that a lug on said sleeve moves in said recess, when said guidehead approaches its top position, a crank shaft and a connecting rod connected between the guidehead and said crankshaft.

4. The combination of claim 3 in which said guidehead is provided with a longitudinal slot from the lower end of said guide to a point substantially above the level of the top edge in said recess of said guide head, when said guide head is in top position, said slot serving a pathway for said lug on said sleeve, when said sleeve is inserted into said cylinder, said longitudinal slot located on the same side where said recess in said guidehead is located.

5. The combination of claim 3 in which said sleeve valve is provided with a recess, extending about half its circumference, opposite the side where said sleeve is driven, said guidehead or crosshead provided at the same side with an upward extension which slides in said recess of said sleeve when nearing its upper center position.

6. A sleeve valve engine having a cylinder, at least one sleeve therein, a pressure head sliding in said sleeve, said pressure head connected to a crosshead, said sleeve having a recess opposite to the side where said sleeve is driven, said crosshead having an upward extension, sliding into and out of said recess in said sleeve near its upper center position.

7. An internal combustion engine having a cylinder, two concentric sleeves in said cylinder, a pressure head reciprocating in said cylinder, said pressure head connected to a crosshead sliding on said cylinder, said sleeves provided with recesses opposite the driving side of said sleeves, said crosshead provided with an upwards extension on the same side as said recess on said sleeves, said extension sliding in said recesses, when nearing its upper center position.

8. The combination of claim 6, in which said crosshead is provided with a recess opposite said upward extension, the driving side of said sleeve reciprocating in the recess of said crosshead, when said latter head approaches its upper position.

9. The combination of claim 7, in which said crosshead is provided with a recess opposite said upward extension, the driving side of said sleeves reciprocating in said recess of said crosshead when the latter approaches its upper center position.

J. A. H. BARKEIJ.